United States Patent [19]
Saidi et al.

[11] 4,364,431
[45] Dec. 21, 1982

[54] METHOD FOR RECOVERING OIL FROM AN UNDERGROUND FORMATION

[75] Inventors: Ali M. Saidi, Paris, France; Frans T. Hesselink, Rijswijk, Netherlands

[73] Assignees: National Iranian Oil Company, Tehran, Iran; Shell Internationale Research Maatschappij B.V., The Hague, Netherlands

[21] Appl. No.: 217,445

[22] Filed: Dec. 17, 1980

[51] Int. Cl.³ .............................................. E21B 43/22
[52] U.S. Cl. ................................................... 166/275
[58] Field of Search ............... 166/275, 274, 273, 272, 166/303, 268, 263

[56] References Cited

U.S. PATENT DOCUMENTS

| | | | |
|---|---|---|---|
| 1,651,311 | 11/1927 | Atkinson | 166/275 |
| 2,792,894 | 5/1957 | Graham et al. | 166/42 |
| 3,490,527 | 1/1970 | Cook et al. | 166/245 |
| 3,498,378 | 3/1970 | Stone et al. | 166/263 |
| 3,548,941 | 12/1970 | Graham et al. | 166/273 |
| 4,040,483 | 8/1977 | Offeringa | 166/272 |

OTHER PUBLICATIONS

"Water-Imbibition Displacement—Can It Release Reluctant Spraberry Oil?" by E. R. Brownscombe, et al., Oil & Gas Journal, vol. 51, No. 28, p. 264.

Primary Examiner—Stephen J. Novosad
Attorney, Agent, or Firm—Pravel, Gambrell, Hewitt, Kirk & Kimball

[57] ABSTRACT

Method for recovering oil from an underground formation consisting of blocks of relatively low permeability with an oil-wet pore space containing oil surrounded by a fracture network of relatively high permeability by supplying to the fracture network an aqueous solution of a surfactant adapted for decreasing the surface tension between water and oil and displacing the oil from the oil-wet pore space of the blocks.

4 Claims, 3 Drawing Figures

METHOD FOR RECOVERING OIL FROM AN UNDERGROUND FORMATION

TECHNICAL FIELD OF THE INVENTION

The invention relates to a method for recovering oil from an underground formation. In particular, the invention relates to a method for recovering oil from an underground formation that consists of permeable blocks of formation material with a pore space substantially consisting of capillary channels formed by interconnected pores, which partially contain oil in channels with oil-wet walls. Such blocks are surrounded by a fluid filled fracture network which is either of natural or artificial origin. This type of formation is referred to hereinafter as a fractured formation.

PRIOR ART

Present recovery processes have great difficulty in producing more than a fraction of the oil that is present in such fractured formations. In recovering oil from this type of reservoir, production wells are drilled into such reservoirs, said wells communicating with the oil-containing part of the fracture network. Oil is recovered from the fracture network via the wells and depending on the underground conditions, the gas cap above the oil layer expands downwards and the water zone below the oil layer grows in size in an upward direction, provided that the reservoir communicates with a water reservoir of sufficiently high pressure. Oil recovery rates will initially be high as a result of the relatively high conductivity of the fracture network.

After the oil in the fracture network has been recovered, large volumes of oil are still present in the pore space of the blocks. Most of this oil, however, remains trapped in the pore space of the blocks by capillary forces. Oil recovery rates will consequently decline to values that are considerably lower than the initial stage of the recovery period.

Displacement techniques, wherein a displacing or drive medium is passed through the formation between an injection well and a production well to displace oil towards the production well, fail when applied in fractured formations (as defined above) since the injected medium will sweep through the fractures only and bypass the pore spaces of the individual blocks with relatively low permeability. In attempts to recover oil from formations of this type by such displacement techniques, large amounts of oil will be left in the formations since the particular combination of blocks of low permeability wherein the oil is trapped by capillary forces, and the highly permeable passages around these blocks, defies the displacement techniques that are effective for increasing the recoverable amounts of oil from the homogeneous type of oil-containing formations.

Apart from the fractured oil-containing reservoirs consisting mostly of rock with oil-wet channels, there exists fractured reservoirs comprising blocks with water-wet channels. In recovering oil from such formations, use is being made of the so-called imbibition technique, wherein water is supplied to the formation and imbibed by the water-wet capillary channels, driving out oil from the pore space of the blocks.

Oil recovery by water imbibition in a naturally fractured water-wet formation was described as early as 1952 by E. R. Brownscombe and A. B. Dyes in the Oil and Gas Journal, Vol. 51, No. 28, p. 264, "Water-imbibition Displacement—Can It Release Reluctant Sprayberry Oil?"

U.S. Pat. No. 2,792,894 (Graham, McCardell, Osoba and Richardson) describes the application of an imbibition technique in an oil-containing formation with water-wet channels comprising porous rock sections adjacent channels of higher permeability than the porous rock sections. After the porous rock sections have imbibed water to substantially the saturation point, a surface active agent is included in the water supplied to the formation. The imbibition of the surface active agent allows additional quantities of oil to be produced from the channels by increased displacement of oil from the blocks into the fracture network by injected water.

U.S. Pat. No. 3,490,527 (Cook and Dimon) discloses an oil recovery process by imbibition of water in a tight, naturally fractured, partially depleted reservoir. First, the pressure in the reservoir is restored to its original value by water injection to recompress and redissolve the free gas phase. The rate of repressuring is critical and must be slow enough to avoid pushing the oil back from the fracture face into the interior of the rock matrix. Production of the reservoir by water imbibition is continued while maintaining the pressure in the reservoir at a high level.

U.S. Pat. No. 3,498,378 (Stone, Graham and Blackwell) describes the recovery of oil from a naturally fractured water-wet formation wherein water is cyclically supplied to the formation thereby increasing the formation pressure, and oil is cyclically produced therefrom, reducing the reservoir pressure. A surfactant is added to the cyclically injected water to render the exterior portion of at least a portion of the matrix blocks oil-wet.

A second cyclic pressure flooding technique, also known as "pressure pulse" flooding, is disclosed in U.S. Pat. No. 3,548,941 (Graham and Ortloff) for recovering oil from a water-wet, naturally fractured matrix reservoir by injecting a solution containing a surface active agent. This agent is meant to further increase the water wettability of the rock matrix and to reduce the oil and water interfacial tension. It is imperative that the matrix remain water-wet so as to preserve the imbibition property of the matrix.

None of the prior art techniques gives a solution for the problems that are faced when recovering oil from fractured reservoirs with matrix blocks comprising oil trapped in capillary channels formed by interconnected pores having oil-wet walls. It should be noted that water present in the fractures cannot enter these pore spaces since the walls of the capillary channels are oil-wet. None of the imbibition techniques as described in the prior art is suitable for use in fractured reservoirs having oil-wet blocks of low permeability.

SUMMARY OF THE INVENTION

The present invention is related to the recovery of oil from fractured formations wherein the oil is substantially retained in the pore space of the blocks by capillary channels having oil-wet walls. The Asmari limestone reservoirs in Iran consist of this type of formation. These reservoirs comprise sedimentary beds of carbonate cut by a substantially orthogonal pattern of fractures or fissures, and further comprise subordinate oblique sets of fractures. Lateral as well as vertical conductivity of fluids through the reservoirs is extremely high on account of this fracture network.

A horizontally extending oil layer may be present in the fracture network between layers of water and gas. Oil is further trapped in the pore space of at least part of the blocks that are surrounded by the fracture network. These oil containing blocks may be present not only in the oil layer, but also in the water or gas layers if such layers are present. It should be appreciated that the presence of oil containing blocks in one or both of these latter layers largely depends on the oil recovery techniques that have been previously applied to the particular formation or reservoir.

The method of the invention comprises the steps of:

(a) compounding an aqueous solution of a surfactant having the ability to decrease the surface tension between water and the oil present in the blocks;

(b) supplying said solution through at least one injection well to the fracture network such that the fluids in the fracture network above the level of the aqueous solution are displaced in a substantially vertical direction by the aqueous solution, thereby raising the hydrostatic head in the fractures surrounding the individual blocks that are being submerged in the aqueous solution and simultaneously decreasing the surface tension in the oil and water interfaces in the capillary channels of said blocks resulting in oil being driven from the channels into the fractures surrounding the blocks;

(c) allowing the oil that is driven from the blocks to collect in the fractures on top of the rising level of the aqueous solution; and (d) recovering oil via at least one production well penetrating the formation and communicating with the fracture network at a level where oil is collecting on top of the aqueous solution present in the fractures.

DETAILED DESCRIPTION

Figure 1:
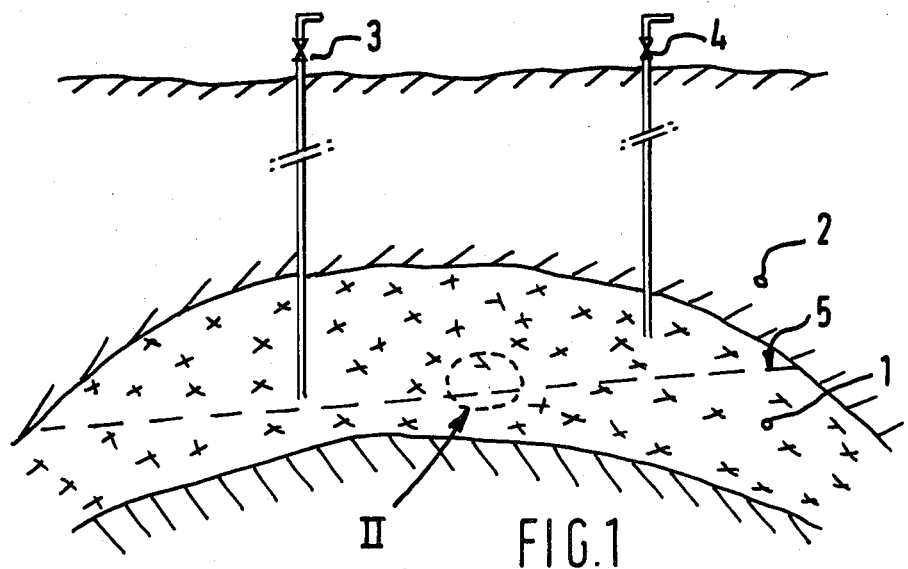
FIG. 1 schematically illustrates a vertical section of the Asmari formation in Iran, a typical fractured formation.

The oil-containing formation 1 shown in FIG. 1 is a highly fractured formation consisting of sedimentary beds of carbonate. These beds are cut by an orthogonal pattern of fractures which are not shown in FIG. 1.

A plurality of wells have been drilled through the formation 2 and into the oil-containing formation 1 and completed in a manner well known to those versed in the art. Only two of these wells have been shown. The well 3 is adapted for supplying fluids to the formation 1, whereas the well 4 is adapted for transporting fluids from the formation 1 to the surface of the earth. The injection well 3 communicates with the fracture network of the formation 1 at a level above the water level 5. The production well 4 communicates with the fracture network of this formation 1 at a higher level than the well 3.

It should be appreciated that the formation 1 shown in FIG. 1 has been subjected to an oil recovery treatment whereby the oil present in the fracture network has been recovered, leaving hydrocarbon gas in the upper part of the fracture network, and water in the lower part thereof. The water level has not risen during this oil recovery process, and that part of the formation above the gas and water interface 5 in the fracture network contains oil trapped in the tight reservoir rock.

The recovery of oil from the fracture network via the well 3 has been effected by gas cap expansion and solution gas drive. It is understood that a small amount of oil continues to drain from the blocks into the fracture network. This oil collecting on top of the water will be recovered simultaneously with the oil from the tight formation blocks by means of the invention.

Figure 2:
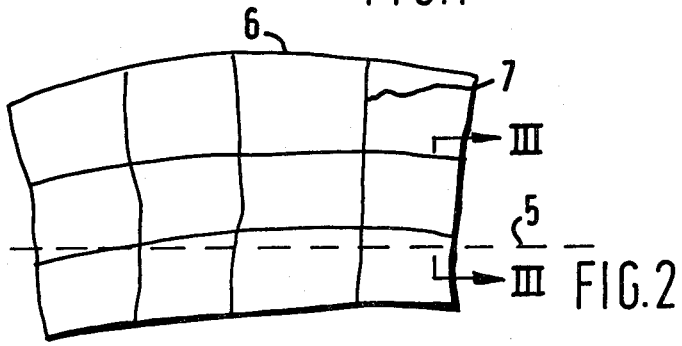
FIG. 2 illustrates detail II of FIG. 1 revealing the formation blocks on a larger scale.
Figure 3:
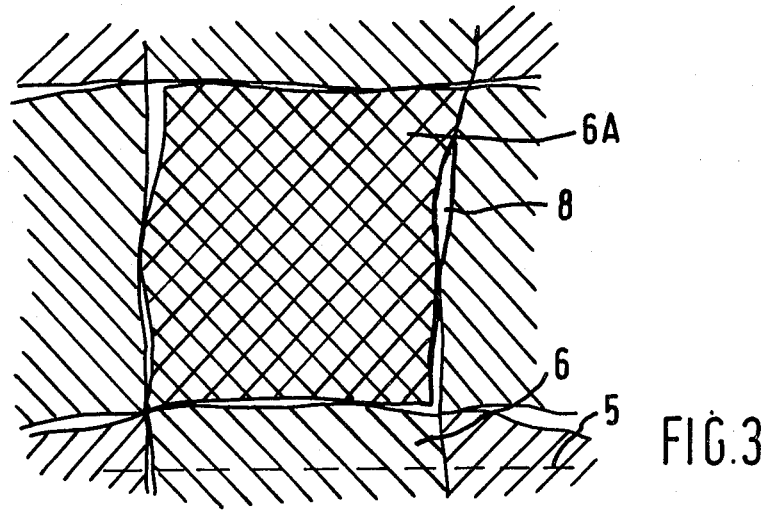
FIG. 3 is a vertical section taken along the line III—III of FIG. 2 illustrating a single formation block surrounded by fractures.

FIG. 2 shows detail II of FIG. 1 on a larger scale. The blocks 6 fit rather closely together, creating a pattern of fractures 7 extending therebetween. The fractures communicate with one another forming a network of fracture passageways that encloses the blocks 6. The fracture network extends through the formation 1 and communicates with the wells 3 and 4 that penetrate the formation. The manner in which the blocks 6 are bounded by fractures 8 of the network is shown in FIG. 3 of the drawing where the width of the fractures 8 is somewhat exaggerated.

Each block 6 consists of carbonate rock of low permeability. The pore space of the blocks substantially consists of capillary channels extending in all directions, the majority of these channels having oil-wet walls. Oil is trapped within these channels by capillary forces, which are sufficiently strong to keep the pore space of the blocks filled with oil over approximately the total height of the blocks, even in those blocks such as 6A that are surrounded by fractures 8 containing gas. It should be noted that raising the water level 5 in the fractures 8 surrounding the block 6A will not result in an imbibition of water into the block 6A as described in the prior art processes since the oil-wet walls of the capillary channels prevent the water from entering the channels.

In the method according to the invention, an aqueous solution is supplied to the fracture network 7 via the well 3. The solution contains a surface active agent having the ability to decrease the surface tension in the interface between the oil present in the blocks and the water present in the fractures 8. The solution after being injected into the fracture network, will be distributed at a relatively low pressure gradient over the gas and water interface 5. The water level in the fracture network 7 will rise, thereby submerging the block 6A, as well as all other adjacent blocks that are situated above the water level 5 shown in FIG. 2.

The injected water having the surface active agent dissolved therein displaces the gas from the oil and gas interfaces at the entrances to the capillary channels of the blocks that are being submerged. The oil in the channels is then contacted by water at an extremely low interfacial tension, and at an increasing pressure from the rising water level in the fractures surrounding the submerged blocks. Since there exists an extremely small interfacial tension at the gas and oil interfaces at the entrances to the capillary channels, the difference in density between the water outside each block 6 that is being submerged and the oil in the capillary channels thereof will force water to enter the oil-wet capillary channels and displace the oil into the fracture network from any capillary channels that debouch in the top or side walls of the blocks.

The interfacial tension in the gas and oil interfaces at all entrances to the capillary channels will be reduced to a relatively small value when a block is fully submerged. In this situation, even the oil that has been trapped in capillary channels of extremely small dimensions that prevented earlier displacement of the oil, will now be displaced under the influence of the difference in density between the water and surfactant solution in the fractures surrounding the block, and the oil present in the extremely small capillary channels.

The displaced oil from the capillary channels of the submerged formation blocks floats on top of the rising waterlevel in the fracture network. When a sufficient volume of oil is present, the pumps (not shown) in the recovery well 4 are started and oil is transported through well 4 to the surface, where it is temporarily stored in a suitable container (not shown) awaiting further transport to another location, such as a refinery.

The wells 3 and 4 are periodically opened to higher levels of the formation 1 when the oil has been recovered from the lower zones of this formation. This minimizes the loss of surface active agent by adsorption to the rock and helps maintain the water cut of the fluids recovered via the production well within acceptable limits.

Surface active agents suitable for use in the method of the present invention are selected on the basis of their ability to decrease the oil and water interfacial tension to the desired degree under formation conditions including the formation temperature, the salinity of the connate water present and the injection water used to prepare the surfactant solution, and the properties of the oil in the formation. Depending on the formation conditions, suitable surface active agents can be selected from various classes of surfactants such as anionic, cationic and nonionic surfactants. Examples of suitable surfactants are alkyl aryl sulphonate, alkyl aryl ethoxy sulphonate, alkyl ethoxy sulphate, alkyl aryl ethoxylate, alkyl ethoxylate, alkyl quaternary ammonium, alkyl aryl quaternary ammonium, betaine type surfactants and mixtures thereof. This list of surface active agents is not exhaustive and the types indicated are given by way of example only. Application of the invention is not limited to a particular surface active agent since any surfactant having the ability to decrease the oil and water interfacial tension in the formation to be treated will be useful.

Application of the invention is not restricted to fractured formations comprising oil-containing blocks where the pore space substantially consists of oil-wet channels and having an oil and water distribution in the fracture network as shown in FIG. 1 of the drawings. The present process may be applied with equally good results where an oil layer is present between the water zone and the gas zone in the fracture network. Surfactant containing water is the preferably injected directly below the oil layer, expanding the water zone upwards, thereby lifting the oil layer. The oil layer is increased in volume by the oil driven from the blocks submerged in the water zone and is recovered by means of one or more production wells.

In another formation of the same type, water may be absent in the situation in which the present process is initiated. Surfactant-containing water is supplied to the fracture network, preferably at a level close to the bottom of the formation in the initial stage of the method, and later at a level that is below, but relatively near, the highest level of the water in the fracture network. The rising level of the solution submerges the blocks and displaces the oil therefrom. The oil collects on top of the solution present in the fracture network. This oil (as well as the oil that may originally be present in the fracture network) is subsequently recovered through one or more production wells.

If gas is not present in the fracture network, the space within this network will contain either oil or water or both. If only water is present, the water is removed from the network by injecting gas until the water level is just below the level of those blocks containing pore space with trapped oil. Thereafter, the process according to the invention is carried out in the manner described. If only oil is present, the production well 4 is opened to the fracture network at the highest possible level and surfactant solution is injected into the fracture network at the lowest possible level.

If oil and water are both present in the fracture network without gas, and some of the oil-containing blocks are submerged in water, steps are taken to lower the water level in the fracture network (such as by the injection of gas) to a level below the assemblage of oil-containing blocks. Subsequently, the process of the invention is initiated by supplying water with a surface active agent to a level below, but relatively near, the oil water interface, and recovering oil via production wells that communicate with the fracture network at the highest possible level. If oil and water and no gas are present in the fracture network, and the water level is at the lower boundary of the oil-containing blocks, the process according to the invention can be immediately applied by injecting water containing the surface active agent in the neighborhood of the water level and preferably just below the oil and water interface. Oil is recovered via production wells that communicate with the fracture network at a level above the said injection level of the water.

The injection wells preferably communicate with the fracture network at levels at which the injected solution is relatively close to the upper level of the rising water level in the fracture network. This reduces the loss of surfactants to a minimum. It is further desirable to reduce contact between the injected solution and an oil layer present in the fracture network to a minimum, such contact takes place when the injected solution flows from the well to the body of water present in the fracture network.

The injection of the surfactant solution may be periodically interrupted. Oil can be recovered from the fracture network during the period of injection of the solution, as well as when the injection has been interrupted. To reduce water cut, the levels at which the production wells communicate with the fracture network are periodically raised.

By way of summary, it is observed that the process according to the present invention makes use of an aqueous solution suitable for reducing the surface tension between oil and water, which solution is supplied to the fracture network of a fractured formation substantially consisting of rock pore space with oil-wet channels for (a) submerging the oil-containing formation blocks in the solution to increase the hydrostatic head around the oil-containing blocks and (b) decreasing the surface tension in the oil and water interfaces at the entrances to the capillary pore spaces of the blocks that are being submerged. The resulting decrease in surface tension allows the trapped oil to be forced out of the capillary pore spaces of the blocks by the hydrostatic head of the water in the formation, with water replacing the formerly trapped oil.

We claim:

1. A method for recovering oil from an underground formation consisting in part of oil-wet permeable blocks having a pore space with capillary channels at least partially containing oil, said permeable blocks being surrounded by a fluid filled fracture network, said method comprising the steps of:
   (a) compounding an aqueous solution of a surfactant having the ability to decrease the surface tension between water and the oil present in the blocks;
   (b) supplying said solution through at least one injection well to the fracture network in order to displace the fluids in the fracture network above the level of the aqueous solution in a substantially vertical direction, thereby raising the hydrostatic head in the fractures surrounding the individual blocks which are being submerged in the aqueous solution while simultaneously decreasing the surface tension of the oil and water interfaces in the capillary channels of said blocks, driving oil from the capillary channels into the fractures surrounding said blocks:
   (c) allowing the oil that is driven from the blocks to collect in the fractures on top of the rising level of aqueous solution; and
   (d) recovering oil through at least one production well penetrating the formation and communicating with the fracture network at the level where oil is collecting on top of the aqueous solution.

2. The method according to claim 1, wherein the fracture network contains liquid that is substantially replaced by gas prior to supplying the aqueous solution to the fracture network.

3. The method of claim 1, wherein the aqueous solution is introduced into the fracture network by an injection well that communicates with the fracture network at a depth that is relatively close below the rising level of the aqueous solution in the fracture network.

4. A method for recovering oil from an underground formation consisting in part of blocks of relatively low permeability surrounded by a fracture network of relatively high permeability, said blocks having pore space with substantially oil-wet walls and at least the pore space of the blocks substantially containing oil, said method comprising the steps of:
   (a) introducing into the fracture network an aqueous solution of a surfactant adapted for lowering the interfacial tension in the interfaces of the water and the oil present in the pore space of the blocks;
   (b) displacing any fluids other than water in the fractures in a substantially vertical direction by the rising level of aqueous solution;
   (c) submerging the individual blocks by the rising liquid level of the aqueous solution of surfactant, whereby the surfactant reduces the oil and water interfacial tension in the pore space of each individual block for formation material, which in combination with the difference in densities between the fluids present in the pore space of the individual blocks and in the fracture network displaces the oil from the pore space of the blocks;
   (d) allowing oil to collect on top of the aqueous solution in the fractures; and
   (e) recovering oil through at least one production well penetrating the formation and communicating with the fracture network at the level where oil is collecting on top of the aqueous solution.

* * * * *